United States Patent [19]
Coulthard

[11] 3,981,803
[45] Sept. 21, 1976

[54] METHOD AND APPARATUS FOR ANAEROBIC FERMENTATION

[76] Inventor: John Louis Coulthard, Lot 9, Frankston Rd., Cranbourne South, 3977, Victoria, Australia

[22] Filed: Oct. 29, 1974

[21] Appl. No.: 518,899

Related U.S. Application Data

[62] Division of Ser. No. 304,785, Nov. 8, 1972, abandoned.

[30] Foreign Application Priority Data

Nov. 11, 1971 Australia.............................. 7000/71

[52] U.S. Cl.............................. 210/178; 48/197 A; 195/143; 195/144; 210/180; 210/195 R; 210/196; 210/202; 210/218; 210/220
[51] Int. Cl.²......................................... C02C 1/14
[58] Field of Search.................... 47/1.4; 61/.5, 1 R; 71/10, 12; 195/1, 127, 139, 143, 144; 210/1, 2, 11, 16, 170, 178–181, 196, 197, 532 R, 533, 195 R, 202, 218, 220; 48/180 H, 197 A

[56] References Cited
UNITED STATES PATENTS

| | | | |
|---|---|---|---|
| 2,520,883 | 8/1950 | Kornemann et al. | 61/.5 X |
| 3,068,561 | 12/1962 | Jones | 61/.5 X |
| 3,151,416 | 10/1964 | Eakin et al. | 61/.5 X |
| 3,383,309 | 5/1968 | Chandler | 210/197 X |
| 3,462,360 | 8/1969 | McKinney | 210/195 X |
| 3,537,267 | 11/1970 | Webb | 61/1 R X |
| 3,732,089 | 5/1973 | Megronigle | 47/1.4 X |

Primary Examiner—Thomas G. Wyse
Assistant Examiner—Robert H. Spitzer
Attorney, Agent, or Firm—Cushman, Darby & Cushman

[57] ABSTRACT

A method for the anaerobic fermentation of organic waste materials in a digestion zone, which method comprises introducing into the zone algae produced externally of the zone, and/or at least part of the liquid substrate in which such algae have been grown.

Apparatus for anaerobic fermentation consisting essentially of a liquid storage tank comprising an inner bag-like container made of flexible material and provided with inlet and outlet means for the introduction of feed materials and the simultaneous removal of liquid and gaseous products, an outer supporting wall or frame, and at least one layer of insulating material arranged between the outer wall of the frame and the container.

11 Claims, 6 Drawing Figures

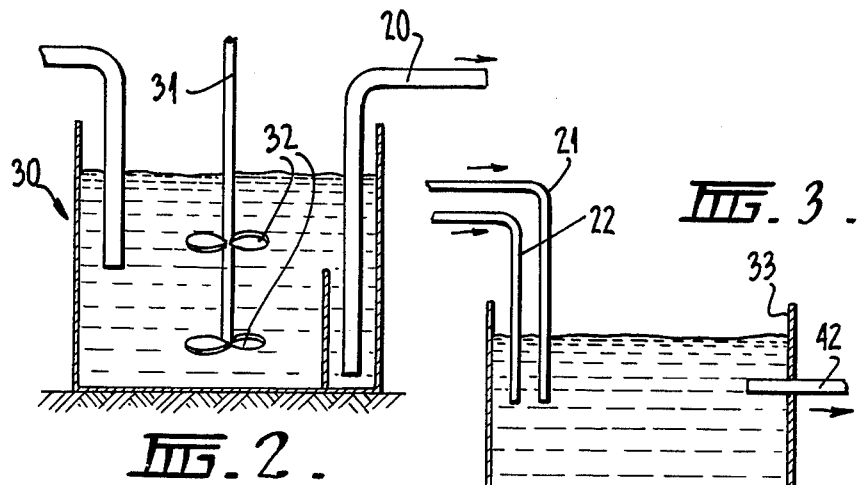
FIG. 2.
FIG. 3.
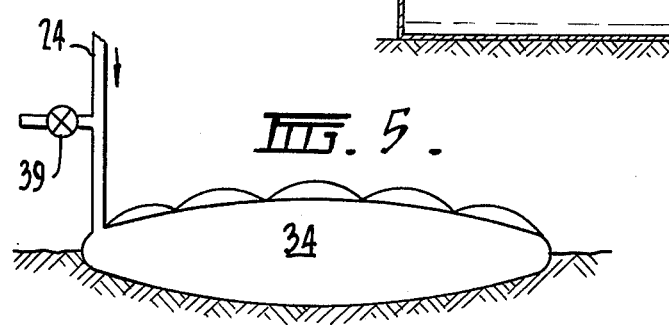
FIG. 5.
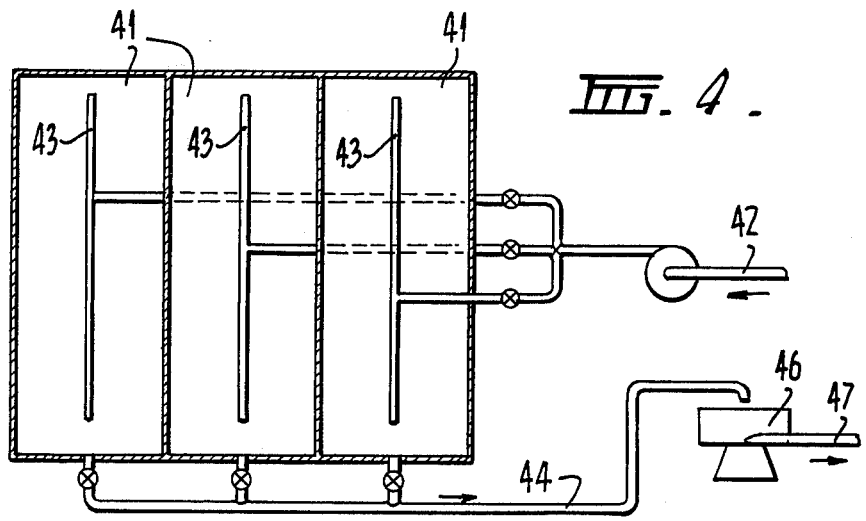
FIG. 4.

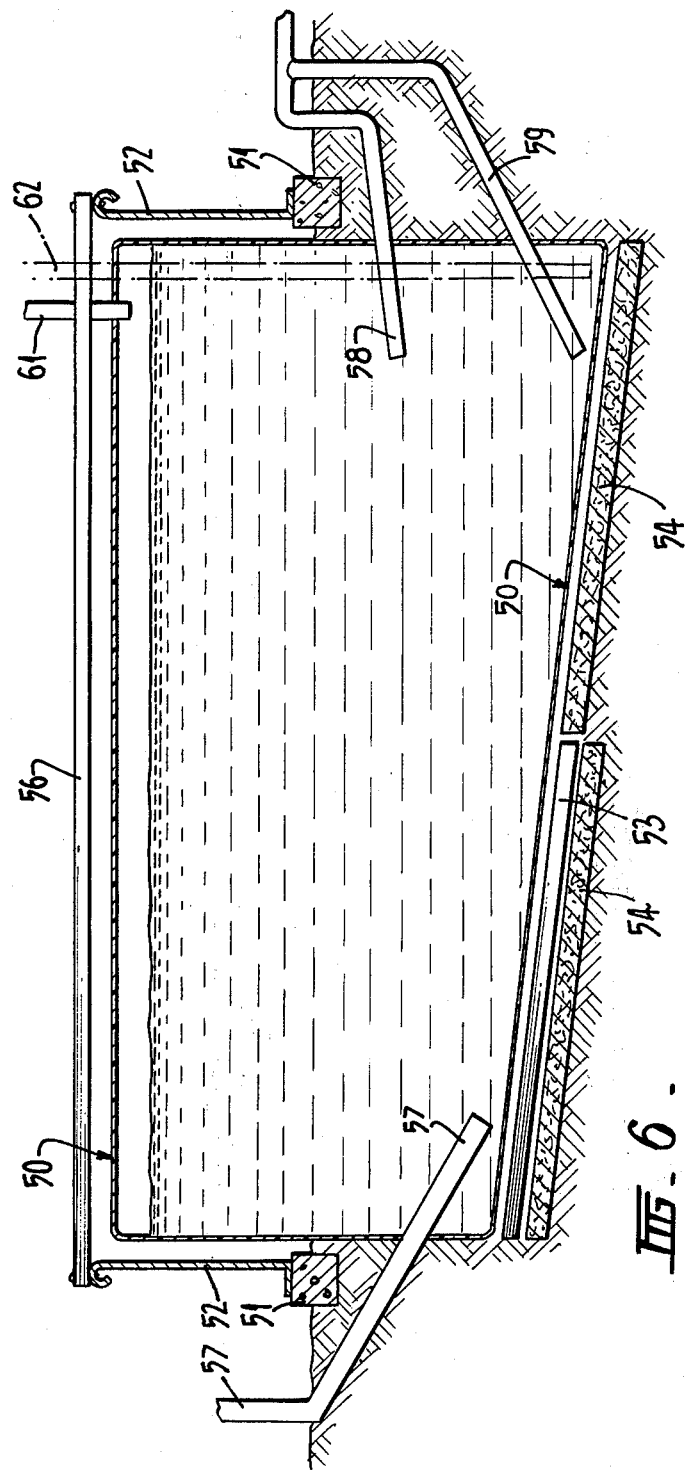

METHOD AND APPARATUS FOR ANAEROBIC FERMENTATION

This is a division of application Ser. No. 304,785 filed Nov. 8, 1972, now abandoned.

This invention is concerned with a method and apparatus for the anaerobic fermentation of organic waste materials, such as agricultural waste or sewage, to yield a combustible gas mixture consisting essentially of methane. In its most preferred form the method of the invention is also capable of providing useful harvests of algae and other by-product materials which may be used in the formation of nitrogenous fertilizers.

The production of methane-rich gases by anaerobic fermentation processes is well known. The microbiological processes involved are complex but it is now believed that two main types of methane-producing bacteria play vital roles, one type being resistant to acids and the other type being inhibited by acids. The acid-resistant type is capable of multiplying rapidly but not so the other type of bacteria. It is the latter which is primarily responsible for dictating the time for complete digestion, and which is the chief factor in adequate gas production.

In consequence of this, there have been many proposals put forward for methods of stabilizing or controlling the acidity of the fermentation medium. Many of these methods simply involve the addition of lime or other alkaline substances in more or less controlled amounts. Other methods rely on the selective removal of components of the fermentation medium and/or the feed-back to the medium of selected components after their removal from the system.

Another difficulty presented in prior art processes is associated with the composition of the feed materials, in that some of the components, especially grease and fats, require a great deal longer to digest than other components, such as proteins. Of these components, it has been observed that in conventional processes, grease requires the longest detention time for complete decomposition. Also, grease and fats, while capable of producing a large proportion of the gas product, and one that is of high quality, are also the most undesirable to handle and the most putrescible. Therefore, it is most desirable to have the grease completely broken down in the anaerobic digestion process, and a correspondingly long detention time in terms of tank volume is therefore normally provided in adequately dimensioned conventional digestion systems.

Known methods for anaerobic fermentation thus involve either (a) batch-loading and sealing of waste products in digestion tanks for digestion and gas production, or (b) scheduled charging of digestion tanks with waste products for a period of from 10 to 30 days, the resultant solids being thereafter discharged so as to leave only enough digested liquid in the tanks to seed oncoming loads. These methods, however, may suffer from one or more of the following disadvantages:

i. Low BOD removal; sometimes only about 50%.
ii. Sludge crusting which occurs on the surface of the liquid in the digester, with an attendant lowering in gas production.
iii. Production of gas having a high (29–35%) $CO_2$ content, which thus lowers the heating value of the gas.
iv. Low gas yield.
v. In the case of methods involving scheduled charging, the necessity to provide extra digestion tanks to cope with high interim loadings.
vi. Non-biodegradable grease build-up which occurs in the digestion tank, necessitating manual removal of the grease.
vii. The production of high acid concentrations which have to be reduced by addition of suitable alkalia.

One object of the present invention is to provide a method for anaerobic fermentation which will overcome or significantly reduce most, if not all, of the above disadvantages.

It has been found that the introduction of algae produced externally of the fermentation process, or at least the liquid substrate in which such algae are produced, into the fermentation medium, results in the neutralization of undesirable acidity in the digestion process, thereby preventing or at least minimising inhibition of the acid sensitive form of methane bacteria and hence increasing gas production. At the same time, the rate of breakdown of fatty acids is increased, as is the nitrogen content of the effluent from the fermentation process. The latter effect may be utilised to advantage by using the effluent as the growth medium for the algae, which also benefits from the controlled acidity of the effluent.

Accordingly, one aspect of the present invention provides a method for the anaerobic fermentation of organic waste materials in a digestion zone, which method comprises introducing into the zone algae produced externally of the zone, or at least part of the liquid substrate in which algae have been grown.

Breakdown of the waste materials may be further enhanced in accordance with a preferred aspect of the invention by premixing of the incoming raw materials and/or introduction into the digestion zone of micro-organisms and/or enzymes which facilitate and/or accelerate breakdown and digestion of cellulose, protein and fatty constituents of the raw feed material. Such additions may include, for example, bacilli, especially aerobic spore-forming bacilli such as *B. subtilis;* filamentous fungi, especially *Aspergillus oryzae* and/or *Rhizopus arrhizus;* and enzymes selected from the following types (the preferred minimum rate of addition being indicated in brackets): cellulose (10 units/gram), amylase (8000 units/gram), lipase (1500 units/gram), protease (8000 units/gram). These enzymes may be derived from any suitable source, including in situ production by micro-organisms.

In addition, it has been found that by removing a substantial proportion of the carbon dioxide from the gas formed in the fermentation process and recycling the carbon dioxide to the ferment, it is possible to increase still further the fermentation efficiency, leading to a gas product of higher methane content and hence higher heating value. Also, the bicarbonate content of the liquid effluent from the fermentation is increased which can also assist in algae photosynthesis.

Thus, in a further aspect, the method of the present invention comprises removal of carbon dioxide from the product gas and recirculation of the carbon dioxide back to the digestion zone.

Separation of carbon dioxide from the product gases and recirculation to the digestion zone can be carried out by any suitable method. One particularly preferred method consists in mixing product gas from the digestion zone with steam under pressure and discharging the hot water resulting from condensation of the steam into the zone along with the gas. The hot water discharge partially assists in raising the temperature in the zone, as well as serving to sparge or break up floating crusts on the surface of the liquid ferment. By this recirculation of carbon dioxide back into the fermentation medium, the methane content of the final product gas is raised and the heating value of this gas improved, by up to 25% of that obtained without $CO_2$ recycle. Additionally, it is found that any $H_2S$ present in the product gas is solubilised and removed by recirculation.

By use of the method of the present invention, it is possible to carry out anaerobic fermentation on a continuous basis, expelling at regular intervals, e.g. daily, an amount of effluent liquid equivalent to the raw feed material entering the digestion zone. The method has been found to produce more gas for a given volume of fermentation vessel used than presently known methods, and to substantially prevent build up of non-biodegradable grease by-products in the vessel.

As indicated above, the preferred method of producing the algae or algae substrate for use in the method of the invention is to use the liquid effluent from the fermentation process. The presence of high nutrient values in the effluent enables the production of substantial amounts of algae using conventional ponding or other known techniques. The preferred algae are *Chlorella* species but any other suitable types found in algae-growing facilities may be used, e.g. species of *Euglena*, *Scenedesmus*, *Pandorina*, *Volvox*, *Chlorogonium*, and *Chlamydomonas*. The species selected will depend to some extent on the use to which the algae product is to be put, i.e. whether for stock feed or fertilizer.

Although it is possible, in accordance with the invention, to return all or part of the whole algae crop to the fermentation vessel, it is preferred to separate at least a substantial proportion of the algae product from its substrate and to return only the liquid substrate, which will contain some algae, to the vessel. Separation may be performed by any suitable method, e.g. centrifugation.

The invention also includes apparatus for carrying out the methods described above.

Known forms of apparatus presently used in anaerobic fermentation processes comprise a tank usually made of concrete, fitted with an airtight dome cover; heat exchange means, usually in the form of water circulation pipes, disposed within the tank; and float-on-water gas holders, usually made of steel, for temporarily collecting gas. These forms of apparatus however suffer from the disadvantage of relatively high cost and, being of essentially permanent construction, cannot be readily moved to suit changing circumstances. Furthermore, the use of heat exchange means disposed internally in the tank leads to build-up of a deposit formed by the waste materials on the outside of the water circulation pipes, as well as formation of scale on the inside of the pipes. As a consequence, the heat exchange efficiency becomes considerably lowered with continued operation.

Another object of the present invention is to provide apparatus for carrying out anaerobic fermentation processes, particularly that of the present invention, which apparatus overcome or significantly minimise the disadvantages of the prior art apparatus as indicated above.

According to another aspect of the present invention, therefore, an apparatus for anaerobic fermentation consists of a liquid storage tank comprising an inner bag-like container made of flexible material and provided with inlet and outlet means for the introduction of feed materials and the removal of liquid and gaseous products, an outer supporting wall or frame, and at least one layer of insulating material arranged between the outer wall or frame and the container.

Preferably there is also provided means for supplying heat to the bag and/or its contents, when in use. More preferably, heat is supplied by heat exchange means disposed below the bottom of the tank in such matter as to enable the contents of the tank to be heated, when the apparatus is in use. The heat exchange means may, for example, be adapted to be disposed wholly or in part below the surface of the ground on which the tank is to be placed.

Preferably, the bag-like container is made of synthetic rubber or plastics material and the supporting wall or frame is fabricated from interconnected panels.

One form of storage tank according to the invention comprises a series of interconnected panels arranged in substantially vertical planes to form a self-supporting structure, insulating material lining the inner surfaces of the panels and a flexible bag-like container arranged within the insulated structure so as to be supported and constrained thereby.

Another form of storage tank according to the invention has a supporting structure comprising a continuous strip joined together at its ends to form an outer supporting wall or frame.

The capacity of the fermentation tank is preferably between 25,000 and 100,000 gallons, depending on the load of liquid-solids to be treated daily. As a rough guide 1 lb. of volatile solids require 4 cubic ft. of silo, and 2½ cubic ft. of gas is produced per cubic ft. of silo. The daily loading of the silo is usually limited to 1/10th of the total gallonage capacity. Thus, a 30,000 gal. silo would have a daily loading capacity of 3000 gallons of water/manure mixture, at an average content of 3 of water to 1 of manure.

In order that the invention may be more fully described, reference will now be made to the construction and operation of several forms of apparatus constructed in accordance with the invention, which apparatus will be described with reference to the accompanying drawings, in which:

FIGS. 2 to 5 show diagrammatically ancilliary apparatus associated with the tank of FIG. 1; and FIG. 6 is a diagrammatic representation of another form of tank constructed in accordance with the invention.

Figure 1:
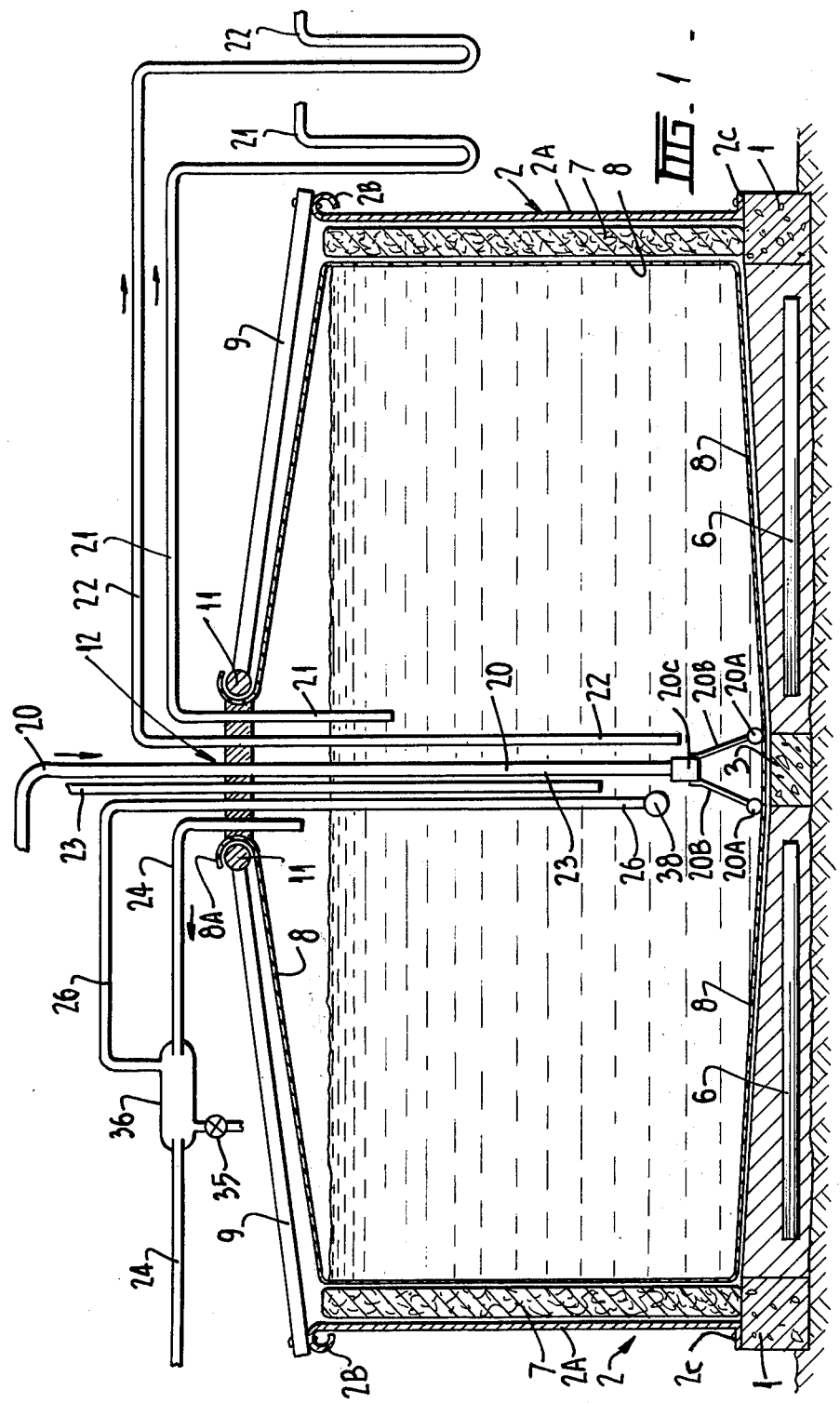
FIG. 1 is a diagrammatic representation of a fermentation tank in accordance with the invention.

It is to be understood that the constructional details, dimensions and other specific data given in this description, are by way of example only and are not to be construed as limiting the invention thereto.

In the embodiment shown in FIG. 1, the fermentation tank is constructed as follows:

A concrete foundation ring 1 is formed to required diameter of the supporting wall 2. In the centre of the ring 1 is constructed a circular concrete pad 3 which is formed equal in height to or slightly lower than the outer concrete ring 1.

The earth between the outer concrete ring and the central pad 3 is excavated to a suitable depth. The excavation is then sealed by any suitable means (not shown) e.g. an aluminised fibreglass-reinforced polyethylene film. A heat exchange unit 6 is then placed in the excavation. One preferred form of unit (not shown in detail) consists of a spirally arranged pipe supported on suitable guides. Other heating devices can be used however, for example, an electrically heated pad or blanket.

The pipe-type heat exchanger is connected, in use, to a suitable source of steam or hot water, e.g. a boiler system.

Earth or sand is then filled under and almost to the top surface of the heat exchanger 6 and rammed level to the height of the concrete ring and central pad 3. This packing prevents the liquid pressure of the tank contents from damaging the heat exchanger.

The outer supporting wall 2 comprises a series of inter-connected panels 2A arranged vertically in the desired configuration for the tank, each panel being fastened at its base to the foundation ring 1 and to adjoining panels along its vertical edges.

The panels 2A are preferably formed from lightweight steel mesh, preferably also with an outwardly rolled top edge 2B and an outwardly disposed bottom flange 2C to facilitate attachment to the ring 1.

The adjoining vertical edges of the mesh panels 2A may be linked together by any suitable means, e.g. with helical, tempered steel coils (not shown). Alternatively, the horizontal wires from one vertical edge of each panel are extended and bent into the form of hooks by which they can be attached to the vertical wire of the plain edge of an adjoining panel. The hooked extensions of the horizontal wires may then be closed under pressure and/or locked by a sheath. As a further alternative, spring rings or U-bolts attached to steel plates could be used to attach adjoining edges of the mesh panels.

A continuous roll of mesh, hooked at the ends, could be used in place of individual panels.

In one form of the invention, the tank is substantially circular but as shown hereinafter tanks may be constructed using a substantially square or rectangular shape. For square or rectangular shapes, the corners of the structure may be reinforced with steel plates attached to the inside faces at the corners or preformed base and top corner shoes may be used. Solid wall panels 2A may also be used in place of the mesh panels.

After the outer wall 2 has been constructed, panels 7 of insulation material are placed internally around the perimeter to fully line the inside face of the wall. The insulation may be affixed to the wall by any suitable means.

The insulation panels 7 may be constructed from a substantially rigid sheet material such as compressed particle board or a like material to which is fastened or laminated an insulation material such as fibreglass, wool, polystyrene form or like material.

A preferred form of construction for the insulating panels 7 is a core of rigid, polyurethane form sandwiched between aluminium sheet or foil on the outside face and P.V.C. coated nylon fabric on the inside face.

In yet another arrangement, the outer supporting wall or frame and the insulating lining therefor may be integral, e.g. in the form of interconnected panels fabricated from polystyrene or like insulating material sandwiched between flat or curved aluminium, galvanized iron, steel or other metal sheeting. Such panels may be joined together by metal or plastic sections or other suitable means.

The insulation between the outer wall or frame and the bag-like container may, in another form of the invention, be comprised of pressed weatherboard material.

It may also be desirable to further reinforce the outer wall or frame by means such as metal links, ropes or bands tightened around the outside thereof to take the pressure existing when the bag-like container described hereinafter.

After installation of the insulating panels 7, and desirably, before the last wall and insulating panels are placed in position, a flexible bag 8 of flexible synthetic plastics material such as polyvinyl chloride or butyl rubber, tailored to the dimensions of the tank and having a neck 8A at the top, is then inserted within the confines of the wall 2.

The neck of the bag is fitted with an airtight pipe manifold 12. The last wall and insulating panels are placed in position (if not already installed).

Support beams 9 are disposed above the bag 8 in a substantially radial manner such that they connect at their outer ends with the wall 2 of the structure and at their inner ends with a support ring 11 disposed above the central pad 3, at a height than that of wall 1. Connection of the beams 9 to the wall 2 may be effected by direct attachment of the beams to the wire mesh panels 2A or, preferably, by metal channels or shoes (not shown) attached to the tops of the panels 2A.

The flexible bag 8 is then inflated by injecting compressed air through one of the pipe openings situated in the manifold 12. The bag is then secured in this position by tying flexible tapes (not shown) which are attached to its upper perimeter and top surface to the support beams and to the top edge of the wall 2 (or the channels or shoes mentioned above). The pipe manifold 12 is then removed and the neck 8A of the bag passed through and secured to the support ring 11. The internal piping (described below) is inserted and attached to the manifold which is then returned to position, secured and made airtight in the neck 8A of the bag 8.

Typically, a system of six pipes passes through the manifold 12. There is one central raw material entry pipe 20 and two liquid exit pipes 21, 22 which siphon the contents of the bag to other stages of the process. The two exit pipes 21, 22 take the effluent from two different levels within the bag. One pipe 21 is located a short distance (e.g. 12 inches) from the bottom of the bag and, is used to remove high solids material (sludge). The other exit pipe 22 is positioned some distance (e.g. 6ft) from the bottom of the bag to remove essential clear liquid effluent. Both siphons operated to keep a constant level of liquid within the bag, usually about 6 inches from the top of the bag.

Another pipe 23 is fitted with an airtight bung which can be removed to insert an auxiliary heater is installed to bring the liquid within the digester to operating temperature during start-up of the process or for other purposes. There is also a fitting on the manifold for a safety valve which may be arranged to automatically stop the entry of feed material to the bag if the pressure in the system exceeds a specified value. A further pipe 24 serves to take off the gas produced, and a pipe 26 serves for sparging and gas purifying purposes as described hereinafter.

The entry pipe 20 is located centrally in the manifold 12 and supported a short distance (e.g. 12 inches) from the floor of the bag 8 by an essentially conical framework comprising a base ring 20A support bars 20B and a hollowed sleeve 20C which is fixed around the entry pipe 20. Thus the base ring 20A rests on the floor of the bag 8 above the pad 3.

Where an external heat exchanger is not used the manifold 12 may carry further pipes such as 23 into which steam, hot water, or an electrical heating element can be introduced for heating purposes.

It will also be appreciated that for smaller installations, particularly, the foundations described above may be dispensed with and the bag 8 may simply rest on level ground or a base of compacted sand. The wall panels 2A may then be simply fastened to the ground by metal spikes or like fixing means (not shown) passing through the flanges 2C.

The raw material entry pipe 20 connects the bag 8 to a mixing tank 30 into which the raw material is initially fed. In the mixing 30, waste materials are mixed with digested effluent and also the fungal/enzyme mixture already described.

The tank 30 is provided with a motor driven stirrer 31 which is of a propeller type and is designed to provide high shear and create a vortex in the tank. The propeller 32 has sharp edges to break and cut up materials such as straw which may be introduced into the system. Capacity of the mixing tank for a 60,000 bag is approximately 3,000 gallons. After the contents of the tank are mixed they are pumped or transferred by gravity to the bag 8 through the inlet pipe 20. At the same time treated effluent is drawn out of the bag 8 through the liquid effluent pipe(s) 21 and/or 22.

If desired an effluent tank 33 may be provided as shown or the effluent may be run directly to the algae pondage as described hereinafter. The effluent tank 33 may be used for sludge settling, the settled sludge being recycled to the mixing tank 30.

The gas emerging from pipe 24 can be passed to any suitable gas storage facility. It is preferred to store the gas in a "pod" formed of a suitable synthetic plastics material e.g. butyl rubber or "Hypalon" (chlorosulphonate polyethylene) as indicated diagrammatically at 34.

As indicated above it is preferred to extract and recycle carbon dioxide from the exit gases. In the preferred apparatus, therefore, gas emerging through the pipe 24 is fed to a separation system to enable the separation of carbon dioxide from the gas stream. This may be a membrane separation device of known type or a device as will now be described. Low pressure steam generated in any suitable manner, e.g. from the heat exchanger boiler mentioned above, is fed through a one way valve 35 into an enlarged section 36 of the gas pipe 24 from the digester where it meets with the gas coming from the digester. The gas then passes on through pipe 24 to the gas storage facility 34 while the steam passes through pipe 26 to a dispersal head 38, consisting of a length of pipe containing small orifices situated within the bag 8. The low pressure steam used overcomes the pressure head of liquid in the bag 8 and enables the release of the gas into the bag. The steam is condensed to hot water and discharged into the tank with the gas. This system not only reduces the $CO_2$ content of the gas without resort to elaborate membrane systems but also partly assists in raising the temperature of the process and inducing turbulence in the contents of the bag to break up any crusts floating on the fermenting material. A blow off valve 39 in pipe 24 set to ½ p.s.i. controls the gas pressure in the system.

The liquid effluent from the effluent tank 33 is preferably fed through pipe 42 to a pondage facility for algae production. A typical arrangement consists of a number of shallow open vats 41. Liquid effluent entering through pipe 42 is pumped into the vats 41 through spray heads 43. The algae/substrate mixture is run or pumped from the vats 41 through pipe 44 to a centrifuge 46 from which the liquid centrifugate is passed to the mixing tank 30 through pipe 47. The partly solid algae residue from the centrifuge can be used as stock feed or fertiliser or passed to a composting facility.

In starting up the apparatus, the bag 8 is filled to normal operating level with water. An auxiliary heat source, i.e. steam or electricity as the case may be, is used to heat the heat exchanger 6 and so bring the contents of the tank up to the normal operating temperature of 32°C (90°F). An enrichment medium is placed in the mixing tank 30. For a 25,000 to 30,000 gallon facility, this medium consists of the following:

| | |
|---|---|
| 21% superphosphate | 10 lb. |
| Dolomite or magnesia lime | 10 lb. |
| Molasses (diluted 10 to 1 with water) | 1 gallon |
| Purine* | 1 gallon |

*Any nitrogenous base can be used including the urine or man or animals.

Once the enrichment media has been introduced charging of the mixing tank 30 with the waste material e.g. faeces, water and urine collected in dung channels, or added in the dry state and mixed with water to a 3 to 1 slurry. If desired, the start-up of fermentation can be further enhanced by the addition of other suitable nitrogen sources such as ammonium salts. Alternatively or additionally, the start-up can be enhanced by the addition of 20 gallons of digested effluent from an already established unit.

After mixing, the contents of the mixing tank 30 are then transferred by pumping or gravity flow into the bag 8. An equivalent amount of liquid from the bag 8 is expelled, either into a further digester, or into the effluent tank 33. At the same time, treated effluent is released into the algae pondage and a portion of the algae substrate from the centrifuge is recycled back into the mixing tank 30 for subsequent charging into the bag 8. Treated effluent from the effluent tank 33 may also be pumped into the dung drains for preseeding purposes. This means that manure from livestock shedding will be mixed with the pre-seeded methane bacteria in the dung drain and this assists the process by preventing sedimentation within these drains. Pre-seeding also assists eventual digestion by keeping down acidity.

The embodiment shown in FIG. 6 of the drawings is a typical fermentation tank for a 60,000 gallon feed lot or abattoir waste treatment plant. In this embodiment the bag 50 is rectangular, and for a 60,000 gallon unit is approximately 52 feet long and 15 feet wide and increases in depth from 12 feet at one end to 14 feet at the other. The bag 50 is partly enclosed and supported by the walls of a rectangular hole of suitable size excavated on the site, with a depth of 8 feet at one end and 10 feet at the other. A concrete plinth 51 is built around the sides of the excavation either before or after excavation, forms the base for a supporting frame 52 consisting of either steel panels or plastic galvanised steel or aluminium sheeting as previously described. (The constructional materials and techniques used in the construction of above ground swimming pools can be used for this purpose.)

The excavation is sealed by any suitable means (not shown) preferably by the use of a sheet of woven polypropylene fabric which acts as a low friction lining to support the bag. On the floor section of the sealed excavation there is placed a heat exchange system 53 consisting of an array of piping or an electrically heated pad or blanket which extends over the width and one half of the total length of the bag 50 and a layer of insulating material 54 which may typically consist of slabs of polystyrene or polyurethane foam is placed around the sides of the excavation. Construction of the apparatus follows the general lines already described.

The bag 50 is inflated with air by any suitable means and attached by a series of slings (not shown) to supporting beams 56 attached to the frame 52.

During inflation of the bag the various inlet and outlet pipes are positioned, these being the raw material inlet pipes 57, the sludge and liquid exit pipes 58 and 59 and the gas exit pipe 61. If desired, a further pipe 62 can be provided for alternate sludge removal.

The sloping floor of the bag 50 ensures that digested sludge collects at the deep end from which point it can easily be pumped out.

The ancilliary equipment and operation of this form of the apparatus are essentially similar to those already described and will not be discussed further.

By the process of the present invention, it is possible to provide a much cheaper and more effecient system of completing the cycle of conversion of waste matter to livestock and human food, as well as providing high energy fuel gas and valuable fertiliser. It is also possible by the use of the algae pondage facility to provide a 47% feed back from the waste materials in the form of a protein-vitamin product which is capable of satisfying the nutritional protein requirements of animals or poultry donating the manure in the first instance. Furthermore, the final treatment of the digester effluent with algae removes all obnoxious odours as well as reducing the BOD content to below 20 p.p.m. and thus satisfies most public health standards and reduces the risk of pollution.

The energy requirements of the process may be entirely powered by the gas produced and by conversion of the gas to electrical power, a pumping, heat exchange and electronic controls may be powered by gas produced by the process, leaving a surplus of at least 60% of the gas produced for use outside the plant.

The effect of the high nitrogen content of the by-product algae has been observed in applications in fertilizing crops and pastures. Marked improvements in fertility and crop yield have been observed in tests which have been carried out using immediate application of the algae waste through piping, for either spraying or irrigating.

The improved amino acid content of the algae produced when fed to livestock and poultry as part (10%) of the normal feed not only increases livestock weight gains dramatically but also substantially increases the carotene content in eggs.

Additionally 20 tons of algae per acre of pondage per annum can be harvested, for livestock feeding, and the centrifuged by-product can be used as fertiliser and a portion for recycling back to the digester. This chlorella has been assessed as worth $90 per ton in its paste form and cost $30 per ton in labour and harvesting outlay, leaving a net profit of $60 per ton or %1200 an acre as against the present Australian profit of $300 an acre on dairy production in advanced irrigation properties.

The fuel gas can be used to increase hydroponic plant growth in greenhouses more than threefold by either burning it or releasing it in the enclosed building so that the plants can absorb the carbon dioxide in the gas.

The process is capable of producing the equivalent of 30 gallons of 110 octane petrol in BTU value in 24 hours, and is this capable of providing a considerable fuel saving to the user.

I claim:
1. Apparatus for use in the anaerobic fermentation of organic waste material in a digestion zone comprising:
   a. a bag-like container made of flexible material for digesting organic waste materials, said container having an opening, a closure member for sealing said opening;
   b. inlet and outlet means extending through said closure member into said bag-like container for the introduction of said waste materials and the simultaneous removal of liquid and gaseous products, respectively;
   c. a wall disposed about said container for supporting said container, said wall comprising a series of interconnected panels extending in substantially vertical planes to form a self-supporting structure;
   d. at least one layer of insulating material disposed between said bag-like container and said wall;
   e. a support member having one end supported on said wall, said support member extending over said bag-like container;
   f. said bag-like container having an upper surface adjacent said support member, and means for securing said upper surface to said support member;
   g. a mixing tank including mixing means for mixing waste materials in said mixing tank, said mixing tank being in communication with said inlet means for passing said waste materials from said mixing tank through said inlet means into said bag-like container;
   h. gas storage means connected to said outlet means for said gaseous products, for storing said gaseous products.

2. Apparatus as claimed in claim 1 wherein the insulating material is in the form of panels attached to the inner face of said wall.

3. Apparatus as claimed in claim 1 wherein said insulating material is an integral part of said wall.

4. Apparatus as claimed in claim 1 wherein said bag-like container has a neck about said opening and said support member includes a ring structure attached about said neck.

5. Apparatus as claimed in claim 4 wherein said closure member is a manifold enclosed by said neck, with said manifold carrying the said inlet and outlet means.

6. Apparatus as claimed in claim 1 including means for separating carbon dioxide from fermentation gases and recycling the carbon dioxide into the said bag-like container.

7. Apparatus as claimed in claim 6, including means for separating cultured algae from a substrate and recycling the substrate to the mixing means.

8. Apparatus as claimed in claim 1 including pondage means for algae culture.

9. Apparatus as claimed in claim 1, and additionally including heating means for heating the contents of the container when in use.

10. Apparatus as claimed in claim 9, wherein the heating means comprises a heat exchanger disposed beneath the container.

11. Apparatus as claimed in claim 1, wherein the gas storage means comprises a bag of flexible material.

* * * * *